US006541118B2

(12) United States Patent
Baalmann et al.

(10) Patent No.: US 6,541,118 B2
(45) Date of Patent: Apr. 1, 2003

(54) INSULATOR HAVING A PORCELAIN BODY AND A HYDROPHOBIC COATING

(75) Inventors: Alfred Baalmann, Osterholz-Scharmbeck (DE); Otto-Diedrich Hennemann, Osterholz-Scharmbeck (DE); Johannes Liebermann, Lichtenfels-Schönsreuth (DE); Klaus Vissing, Morsum (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/778,533

(22) Filed: Feb. 7, 2001

(65) Prior Publication Data

US 2001/0020543 A1 Sep. 13, 2001

Related U.S. Application Data

(63) Continuation of application No. PCT/DE99/02303, filed on Jul. 27, 1999.

(30) Foreign Application Priority Data

Aug. 7, 1998 (DE) ........................................ 198 35 916

(51) Int. Cl.[7] .............................. B32B 9/04; C08J 7/18

(52) U.S. Cl. ....................... 428/447; 428/446; 428/336; 427/489; 427/490

(58) Field of Search ................................ 427/509, 515, 427/487, 488, 489, 490; 428/336, 446, 447

(56) References Cited

U.S. PATENT DOCUMENTS 4,718,907 A * 1/1988 Karwoski et al. ........... 204/169
5,409,777 A * 4/1995 Kennedy et al. ........... 428/34.4
5,627,079 A * 5/1997 Gardella et al. ....... 427/255.29
6,114,032 A * 9/2000 Kelber ....................... 427/509

FOREIGN PATENT DOCUMENTS

FR 7619127 2/1977

OTHER PUBLICATIONS

"Veränderung der Glasur von Isolatoren durch Behandlung mit Plasma", A. Tyman et al., 9th International Symposium of High Voltage Engineering, Graz, Austria, Aug. 28 to Sep. 1, 1995, pp. 1–5.

"Wirkungsweise von Siliconfilmen auf Hochspannungsisolatoren", Hans–Horst Steinbach, Elektrotechnische Zeitschrift—A, vol. 96, 1975, pp. 126 to 128.

"Advances in Basic and Applied Aspects of Microwave Plasma Polymerization", M.R. Wertheimer et al., Thin Solid Films, 115, 1984, pp. 109–124.

"The Dielectric Behavior or Plasma–Treated Insulation Surfaces", Demin Tu et al., Conference Record of the 1990 IEEE International Symposium on Electrical Insulation, Toronto, Canada, Jun. 3–6, 1990, pp. 96–99.

"Behaviour of Modified insulator surface material under electric stress", J. Fleszynski et al., Nordic Insulation Syumposium, Bergen, Jun. 10–12, 1996, pp. 115–121.

* cited by examiner

*Primary Examiner*—Robert Dawson
*Assistant Examiner*—Michael J Feely
(74) *Attorney, Agent, or Firm*—Laurence A. Greenberg; Werner H. Stemer; Ralph E. Locher

(57) ABSTRACT

An insulator with a molding made of ceramic and a hydrophobic coating applied to the surface of the molding is disclosed, the hydrophobic coating comprising a plasma polymer having been applied directly to the ceramic. The previously customary glaze on the surface of the ceramic is replaced by the plasma polymer. Such an insulator has high long-term stability with regard to its electrical insulating capability. It is possible to dispense with complicated shaping of the molding to increase the leakage path over the surface of the ceramic and with the application of a glaze, which means a considerable cost saving.

15 Claims, 2 Drawing Sheets

INSULATOR HAVING A PORCELAIN BODY AND A HYDROPHOBIC COATING

CROSS-REFERENCE TO RELATED APPLICATION

This application is a continuation of copending International Application No. PCT/DE99/02303, filed Jul. 27, 1999, which designated the United States, and which was published as WO 00/08659 on Feb. 17, 2000, in a language other than English.

BACKGROUND OF THE INVENTION

Field of the Invention

The invention relates to an insulator with a molding made of ceramic and a hydrophobic coating applied to the surface of the molding.

An insulator with a molding made of ceramic is used variously in electrical insulating engineering. For example, such an insulator is used as a component in microelectronics, as an insulating housing for components in power electronics, but also as a high-voltage insulator for routing overhead power lines or for keeping them apart.

A ceramic is understood as meaning a clay ceramic, a porcelain or a steatite. The ceramic is produced from the starting materials kaolin, quartz, clay, alumina and/or feldspar by mixing the same while adding various substances in a subsequent firing or sintering operation.

The versatile use of an insulator with a molding made of ceramic in electrical insulating engineering is attributable to the specific properties of the ceramic or the ceramic material which cannot be achieved by other materials. For instance, a ceramic is distinguished by high dimensional stability, great hardness and mechanical strength, by a high electrical insulating capability, by advantageous dielectric behavior, by a great corrosion resistance as a result of high resistance to chemical influences and by a great resistance to heat and effects of the weather.

In long-term use, an insulator is subject to a greater or lesser degree of superficial soiling, depending on the location at which it is used, which can considerably impair the original insulating characteristics of the clean insulator. Such soiling is caused for example by the depositing of industrial dust or salts or the separating out of dissolved particles during the evaporation of moisture precipitated on the surface. This is referred to as surface pollution.

A fired ceramic is distinguished by relatively high surface roughness. Since a rough surface soils much more quickly than a smooth one, it is known to provide the surface of the ceramic molding of an insulator with a surface glaze in the form of a vitreous melt. It is attempted in this way to achieve a kind of self-cleaning effect, which considerably reduces the soiling tendency of the insulator. However, the production costs are increased considerably by the application of the glaze. Raw materials, pigments and the preparation and application of the glaze to the sometimes complicated geometries of the ceramic moldings represent a considerable cost factor. The application of the glaze, as an additional process step, also increases the wastage from production.

Many times, the application of a smooth glaze to the surface of the ceramic molding is not sufficient to ensure the electrical characteristics of the insulator on a long-term basis. Since even a smooth glaze cannot permanently prevent deposits, the geometry of the ceramic molding must additionally be designed in such a way that the leakage path for a possible discharge current over the surface of the molding is as long as possible. Thus, for example, a high-voltage insulator has a large number of plate-shaped ribs or shields along a cylindrical shank. Allowance is made for the different locations at which it is used by different numbers of shields, differences in shield inclination and/or differences in shield projection. This configuration has the effect that the leakage path between the two poles to be insulated is increased considerably in comparison with a purely cylindrical insulator. The shield configuration in combination with the smooth glaze allows a kind of self-cleaning effect of the surface of the molding to be achieved by the soiling being washed away by rain.

In comparison with a simple form of the insulator, however, every change in the geometry toward an increased leakage distance means extra expenditure in terms of material and production time and consequently an increase in production costs.

Furthermore, it has been found that even a great leakage path for an insulator with a ceramic molding with a glaze is not always adequate to ensure the desired electrical insulating capability over a prolonged period of time under particular operating conditions. For instance, the glazed ceramic molding of an insulator which is used in cases of high surface pollution must be manually cleared of deposits at regular time intervals in order for the functional capability not to be at risk. In addition, the known glazes, consisting of a vitreous melt, display a disadvantageous hydrophilicity of their surface. A film of water which traps the dirt particles on the surface is formed. The surface of the insulator becomes conductive. As a result, so-called discharge currents develop on the moist, soiled surface, increase until there is a flash-over and in this way initiate the electrical failure of the insulator.

To solve the problem, it is known from "Elektrotechnische Zeitschrift—A", volume 96 (1995), pages 126 to 128, to apply a coating of silicone additionally to the glaze of the ceramic molding. This takes place by applying a silicone paste or a silicone elastomer. Since silicone is hydrophobic, the surface structure of the glaze is changed in such a way that it repels water. This prolongs the operating characteristics of the soiled insulator.

However, a coating of silicone paste is disadvantageously not durable, and must be renewed from time to time, for example when the system is not in operation. In addition, both the necessary silicone paste and the silicone elastomer are expensive.

Furthermore, the publication "Insulators Glaze Modified by Plasma Processes", Tyman, A.; Pospieszna, I.; Iuchniewicz, I.; 9$^{th}$ International Symposium of High Voltage Engineering, Graz, Aug. 28 to Sep. 1, 1995, discloses an insulator with a molding made of ceramic and a glaze applied to the ceramic, with a hydrophobic, plasma-polymer coating being additionally applied for the protection of the glaze from external influences. Disadvantageously the hydrophobicity and durability of the plasma-polymer coating described are strongly dependent on the type of glaze.

SUMMARY OF THE INVENTION

It is accordingly an object of the invention to provide an insulator that overcomes the above-mentioned disadvantages of the prior art methods and devices of this general type, with a molding made of a ceramic which has high long-term stability with regard to its electrical insulating capability, in particular when used in a damp and/or dust-containing environment.

With the foregoing and other objects in view there is provided, in accordance with the invention, an insulator having a molding made of a ceramic and a hydrophobic coating applied to the surface of the molding, a plasma polymer being applied directly to the ceramic as the hydrophobic coating.

In other words, the insulator according to the invention is distinguished by the fact that, instead of a hydrophilic glaze, a hydrophobic plasma polymer is applied directly to the ceramic of the molding. The glaze of the surface of the ceramic molding is no longer needed and is therefore omitted. With the glaze omitted, the molded ceramic of the insulator according to the invention can have a rough surface to which the hydrophobic plasma polymer is directly applied.

Accordingly, the insulator according to the invention consists essentially of a molded ceramic having applied to a surface thereof a hydrophobic coating comprising a plasma polymer.

Previous considerations concerning the improvement of the long-term stability of the electrical insulating properties of an insulator with a molding made of a ceramic were aimed at coating the already waterproof surface of the ceramic with a smooth glaze. The glaze as such was considered an indispensable part of the ceramic molding or insulating body because of the better self-cleaning effect intended by it. For further improvement, it was attempted to compensate for the hydrophilic character of the glaze by a hydrophobic coating applied to the glaze.

In a way surprising to a person skilled in the art, the invention now envisages dispensing completely with the glaze of the ceramic molding, and instead applying a plasma polymer directly to the ceramic of the molding as the hydrophobic coating.

The invention proceeds in a first step from the finding that not only a reduction in the roughness but also an increase in the hydrophobicity of the surface of the molding helps to reduce considerably the soiling tendency of the insulator.

Although it is true that a smooth surface soils less than a rough one, a high degree of hydrophobicity of the surface can compensate for the soiling tendency of a rough surface. This is because, precisely in the case of use in a damp environment or outdoors, most deposits on the surface result from dissolved particles when precipitated water evaporates. If the surface of the ceramic molding then has a high degree of hydrophobicity, the water does not adhere to the surface in the first place, but forms beads together with the dissolved particles and drops off. The accumulation of deposits is thus counteracted.

In addition, in outdoor use, dust-containing deposits on a hydrophobic surface are easily washed away by rain, even if the surface is rough. With regard to the soiling tendency, when the insulator is used in damp conditions or outdoors, the hydrophobicity of the surface of the ceramic molding is accordingly able to compensate for the roughness. This of course also applies when the soiled insulator must in any case be cleared of foreign deposits manually, for example with water, acetone or the like. Also, when used in a very salty atmosphere, such as for example near the coast, a hydrophobic surface of the unglazed molding helps the insulator to achieve better long-term electrical characteristics than a hydrophilic glazed surface.

In a further step, it has been recognized that precisely a plasma polymer is outstandingly suitable as a hydrophobic coating which can be applied directly and with good adhesion to the relatively rough surface of an unglazed ceramic.

In accordance with this invention, the term "plasma polymer" refers to a polymer produced by plasma deposition, which, as distinct from the polymer produced by conventionally chemical means, has a much higher crosslinking density of the individual molecular groups among one another, is not oriented but amorphous and, moreover, has a much higher density. A plasma polymer is distinguished, for example in comparison with a conventional polymer, by broadening of the infrared vibration bands measured by means of IR spectroscopy.

To produce the plasma polymer, a plasma of ionized molecules is ignited in a suitable reactor in a working gas by applying an electrical field or by coupling in microwaves. Under suitable conditions, the plasma polymer is formed in the plasma on the surface of the substrate to be coated by a wide variety of chemical reactions. For the production of a plasma polymer, reference should be made to the article "Advances in Basic and Applied Aspects of Microwave Plasma Polymerization", M. R. Wertheimer et al. in Thin Solid Films, No. 115 (1984), pages 109 to 124. For the production of a hydrophobic plasma-polymer coating on an electrical insulator, reference should be made in particular to the German patent application filed at the same time at the German Patent Office with the title "Herstellungsverfahren fur einen elektrischen Isolator" [production process for an electrical insulator] with the internal file reference GR 98 E 8511, the content of which also constitutes part of the present document.

The precise chemical reactions which lead to the depositing of a plasma polymer from the plasma in the working gas are not yet known in detail today. A plasma polymer also cannot be described by specifying a precise chemical composition, since a plasma polymer is specifically distinguished by a large number of very different molecules crosslinked among one another. Therefore, to designate the plasma polymer, those skilled in the art refer to the working gas used, in which the plasma is ignited. If, for example, hexamethyldisiloxane is used as the working gas, the plasma polymer produced from it is referred to as a plasma-polymerized hexamethyldisiloxane. This designation, common among those skilled in the art, is adopted in this document. It is irrelevant for the invention whether the plasma polymer is firmly bonded to the surface of the ceramic as a result of chemical bonds or whether, on account of a very high crosslinking density of its individual molecular groups among one other, it is so stable that a chemical bond with the ceramic is no longer important.

For generating a hydrophobic plasma polymer, it is expedient if the plasma polymer is produced by plasma deposition from a volatile compound having non-polar groups, i.e. a non-polar gas or a gas having non-polar groups. It has been found in accordance with this invention that plasma deposition from the non-polar working gas or working gas having non-polar groups produces a plasma polymer with a not very reactive, i.e. low-energy, surface. Such a surface is highly hydrophobic, i.e. water-repellent.

Favorable working gases are, for example, hydrocarbons. Consequently, methane or acetylene are suitable.

Particularly good hydrophobicity and a high degree of crosslinkage of individual molecular groups are distinguishing features of a plasma polymer in the form of a plasma-polymerized organosilicon or organofluorine compound. On account of the high degree of crosslinkage, such a plasma polymer is extremely stable and protected against outside effects. Such a plasma polymer has a high degree of hardness. For this reason, such a plasma polymer is of great advantage for the hydrophobic coating of the surface of the ceramic molding of the insulator.

It is particularly favorable for the hydrophobicity, hardness and quality of the plasma polymer if the plasma polymer comprises a plasma-polymerized hexamethyldisiloxane, a plasma-polymerized tetraethylorthosilicate, a plasma-polymerized vinyltrimethyl-silane, a plasma-polymerized octofluorocyclobutane or a mixture thereof.

In an advantageous refinement of the invention, the coating has a thickness of between 50 nm and 10 $\mu$m. In this way, a hard and durable coating of the surface of the ceramic molding is ensured. With such a thickness, the high degree of crosslinking of the individual molecular groups of the plasma polymer among one another reliably ensures that moisture cannot penetrate through the plasma polymer. Even small molecules such as oxygen, hydrogen or carbon dioxide can no longer penetrate through the cluster of molecules of the plasma polymer.

In a further advantageous refinement of the invention, the ceramic of the molding of the insulator is a porcelain, i.e. a silicate ceramic. Such a ceramic is distinguished by high mechanical strength both with respect to compression and with respect to tension and by a good electrical insulating capability. Such a ceramic is therefore used in particular for an insulator which is exposed to high mechanical loads.

For example, such a ceramic is used for a molding of a high-voltage insulator which is used for routing and/or keeping apart overhead lines or train catenary systems. The plasma polymer applied to the surface of the ceramic molding has the effect of improving the operating performance of the insulator even under environmental influences. In regions with surface pollution, a hydrophobically coated insulator is far superior to a glazed, uncoated hydrophilic insulator.

A high-voltage insulator, in particular with a molding made of a porcelain with an added amount of aluminum oxide, with a hydrophobic plasma-polymer coating of the surface of the molding, is used wherever the longest possible service life has to be ensured in cases of surface pollution and damp weather conditions. Even in the case of use under extreme environmental influences, such as for example in coastal regions where there is a high salt content in the ambient air, or close to industrial sites with industrial dust and aggressive gases in the ambient air, such a high-voltage insulator is distinguished by a much longer, maintenance-free service life with regard to its insulating capability in comparison with a conventional high-voltage insulator. On the one hand, the plasma polymer prevents dissolved particles from being deposited from precipitated water, since the water forms beads off before evaporating. On the other hand, the plasma polymer also achieves the effect that the ceramic insulating body, which is the actual means of providing the insulating properties, withstands environmental influences. Precisely in use outdoors, the hydrophobicity additionally achieves the long-term effect that there are fewer foreign deposits, since every time it rains the precipitated dust is reliably washed away by rainwater. The greatest effect, however, is that, even with an already soiled surface of the insulator, its operational reliability is sustained, because, as a result of the hydrophobicity, no conducting layers of foreign material with critical discharge currents can form.

The invention offers the advantage that an insulator with a molding made of a ceramic can dispense entirely with the previously necessary glaze for treating the surface. The required costs for the glaze and its application are no longer incurred. The process for generating a plasma polymer on the surface of a substrate, in particular a ceramic, is substantially known. Apart from the once-only procurement of a plasma reactor with the required other components, the production of a plasma polymer is a relatively low-cost process. An insulator with a molding made of a ceramic with a plasma polymer applied directly to the ceramic can be produced at lower cost, or at least at the same cost, as a conventional insulator with a molding made of a ceramic and a glaze applied to the ceramic. Replacement of the glaze by a hydrophobic plasma polymer has the effect of drastically reducing the risk of flashover as the final consequence of the formation of critical discharge currents. Even in cases of dust deposits, it has been found that, precisely when the insulator is used outdoors, it is possible to compensate for the greater roughness of the surface of the ceramic molding by the hydrophobicity of the plasma polymer. An insulator with a molding made of a ceramic and a plasma polymer applied directly to the ceramic is distinguished by extremely favorable long-term characteristics with regard to its electrical insulating capability. The time between routine cleaning and maintenance operations for systems subject to and at risk from pollution can be drastically extended.

The invention also offers the advantage that it is possible to dispense with a special, complex geometry of the molding to increase the leakage path. Since the hydrophilic glaze is replaced by a hydrophobic plasma polymer, the ceramic insulator is more reliable, specifically under environmental influences.

The depositing of particles when precipitated water evaporates is also avoided.

The invention also allows a significant reduction in the multiplicity of types with regard to the required geometries of the ceramic molding. In an ideal case, the invention allows, for example in the case of a high-voltage insulator, that it can be designed in a substantially cylindrical or rod-shaped form. In this way, it is even possible to achieve the effect that it is impossible for dust deposits to be deposited.

The invention consequently makes possible insulators with a ceramic molding of a relatively simple geometry with at the same time favorable long-term characteristics with regard to the electrical insulating capability. In this way, the material costs for the manufacturer are considerably reduced in comparison with conventional insulators with a complicated geometry. For the user, currently necessary cleaning and maintenance work is no longer needed or becomes necessary at much longer time intervals.

Other features which are considered as characteristic for the invention are set forth in the appended claims.

Although the invention is illustrated and described herein as embodied in an insulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Test 1

Figure 1:
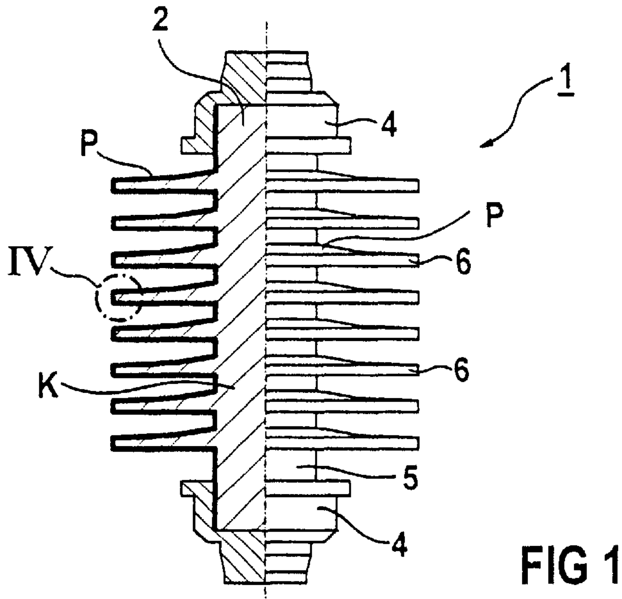
FIG. 1 shows in a partially broken-open representation an insulator adapted as a high-voltage insulator. The ceramic molding has a substantially cylindrical shank and a number of plate-shaped shields provided on it. The entire surface of the ceramic molding is covered with a plasma polymer.

An insulator provided with a glaze and with a molding made of a ceramic is in each case compared with an insulator according to the invention having an identical shape and a hydrophobic plasma polymer applied directly to the unglazed surface of the ceramic of the molding. The plasma polymer is in this case produced by plasma ignition in hexamethyldisiloxane. It is accordingly a plasma-polymerized hexamethyldisiloxane. The layer thickness of the applied plasma polymer is 1000 nm.

The ceramic of the compared insulators is an alumina porcelain of the type C120 according to DIN-EN 60 672. Porcelains or ceramics of a different composition do not make any difference here. The hydrophobicity of the plasma polymer is characterized by a wetting angle of distilled water of 131°. The wetting angle was determined in accordance with the standard DIN-EN 828.

The electrical insulating capability of the insulators is tested in accordance with a rain test as specified by IEC 60/1 (1989), equipment specification IEC 383-1=VDE 0446, Part 1, May, 1997. In this test, the insulators are respectively suspended in a correspondingly suitable room and exposed to rain of a predetermined intensity and at a predetermined angle. The flashover voltages are ascertained from an oscillogram. Five flashover tests are carried out in each case.

Test 1A)

High-voltage insulators with a length of 50 cm are compared. The moldings have in each case a substantially cylindrical shank with a diameter of 75 mm and nine plate-shaped shielding ribs, which are in each case spaced apart from one another by a shield spacing of 45 mm. The shield diameter is in each case 223 mm.

Test 1B) High-voltage insulators of the type L60/5 as specified by DIN 48 006 with a shank diameter of 60 mm and five equally spaced-apart shielding ribs are tested. The form of the connection caps is insignificant here. This type is often used as a railroad insulator.

Result

The insulating capability of the insulators with glaze does not differ from the insulating capability of the insulators without glaze with a plasma polymer applied directly to the ceramic. This means that the unglazed insulator with a hydrophobic, plasma-polymer coating is in no way inferior in its properties to an insulator with a glazed ceramic produced according to the prior art. The variation within the measured values is very low.

Test 2

To assess the characteristics with respect to layers of foreign material, high-voltage insulators shaped according to test 1A with a plasma-polymer coating applied directly to the ceramic of the molding are subjected to a 1000-hour salt-spray test on the basis of IEC-1109 for plastic insulators or plastic-coated insulators.

Result

Even after being used for 1000 hours in a salt spray, the high-voltage insulator without glaze still has the same properties as at the beginning of the test. This is evidenced by the durability and sustained hydrophobic effect of the plasma polymer.

Test 3

A high-voltage insulator with glaze shaped according to test 1B (insulator G) and an unglazed high-voltage insulator according to the invention according to test 1B, with a hydrophobic plasma polymer applied directly to the ceramic of the molding (insulator P), were subjected to a salt-spray test on the basis of IEC 507 (1991) and VDE 0448, Part 1, 1994. The results are compared.

In preparation, the high-voltage insulators are washed with trisodium phosphate. Subsequently, the high-voltage insulators are preconditioned as specified in IEC 507 (1991). The preconditioned high-voltage insulators are subjected to a standing test with respectively predetermined salt mass concentrations in air. Each test lasts at least one hour, assuming that no flashover takes place. The maximum standing salt mass concentration is ascertained in each case at a test voltage of 15 kV (AC voltage) in accordance with IEC 507 (1991), page 19, i.e. the highest salt mass concentration at which, in three tests, the high-voltage insulator investigated exhibits at most one flashover within the one-hour test period.

Result

The result of the salt spray test is summarized in table 1.

TABLE 1

| Test piece | Salt mass concentration ($kg/m^3$) | Result |
|---|---|---|
| Insulator P | 56 | flashover 26 min. |
| | 56 | flashover 13 min. |
| | 40 | no flashover |
| | 40 | flashover 12 min. |
| | 40 | no flashover |
| | 40 | no flashover |
| Insulator G | 28 | no flashover |
| | 40 | flashover 54 min. |
| | 40 | flashover 36 min. |
| | 28 | no flashover |
| | 28 | flashover 23 min. |
| | 28 | no flashover |

It can be clearly seen that the unglazed high-voltage insulator with plasma-polymer coating (insulator P) is to be assigned a standing salt mass concentration of 40 $kg/m^3$ and the glazed high-voltage insulator (insulator G) is to be assigned a standing salt mass concentration of 28 $kg/m^3$. In three successive tests with the salt mass concentration of 40 $kg/m^3$ (insulator P) and 28 $kg/m^3$ (insulator G), only one flashover took place in each case in a respective test period of one hour. At the respectively higher salt mass concentration of 56 $kg/m^3$ (insulator P) and 40 $kg/m^3$ (insulator G), in two successive tests flashovers respectively took place within the test period of one hour.

The ascertained standing salt mass concentration is consequently higher for the unglazed high-voltage insulator coated with a plasma polymer according to the invention than for the glazed high-voltage insulator according to the prior art.

Since, according to IEC 507 (1991), table B1, a standing salt mass concentration of 28 $kg/m^3$ and a standing salt mass concentration of 40 $kg/m^3$ lie within the tolerance range of a single salt stage for the type of insulator investigated, the results achieved are at least to be regarded as equivalent. The unglazed high-voltage insulator coated with a hydrophobic plasma polymer is consequently in no way inferior in its electrical characteristics to the glazed high-voltage insulator.

The omission of the glaze and its replacement by a hydrophobic plasma polymer consequently does not produce any different results for a high-voltage insulator with a ceramic molding in comparison with a glazed high-voltage insulator of the same type. The hydrophobic plasma-polymer surface of the unglazed high-voltage insulator displays the same characteristics with respect to layers of foreign material as the surface of the glazed high-voltage insulator.

Now turning to the figures:

In FIG. 1, an insulator 1 adapted to be used as a high-voltage insulator is shown in a partially broken-open representation. The insulator 1 has a molding 2 made of a ceramic K, and connection caps 4 for the connection and/or routing of current-carrying lines. The molding 2 is designed as a substantially cylindrical shank 5 with a number of plate-shaped ribs 6 provided on it. Instead of a customary glaze, a plasma polymer P has been applied to the surface of the ceramic K of the molding 2. The plasma polymer P is produced by plasma deposition from a non-polar gas or a gas having non-polar groups and is highly hydrophobic. Organosilicon or organofluorine compounds and, in particular, hexamethyldisiloxane are suitable in particular as gases. The wetting angle of deionized water lies between 90 and 140°.

Figure 2:
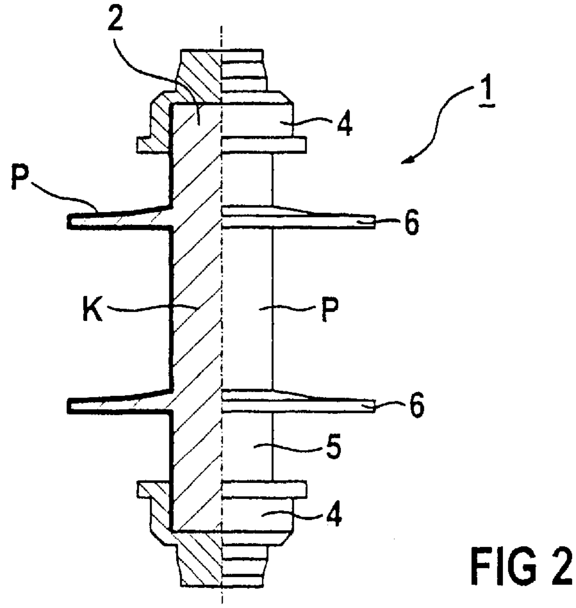
FIG. 2 shows in a partially broken-open representation an insulator according to FIG. 1, with fewer plate-shaped shields.

In FIG. 2, an insulator 7 adapted for use as a high-voltage insulator is likewise shown in a partially broken-open representation. In comparison with the insulator 1 according to FIG. 1, the number of ribs 6 of the molding 2 made of ceramic K is reduced. The length of the insulators 7 and 1 is identical here. However, there are only two ribs 6.

Figure 3:
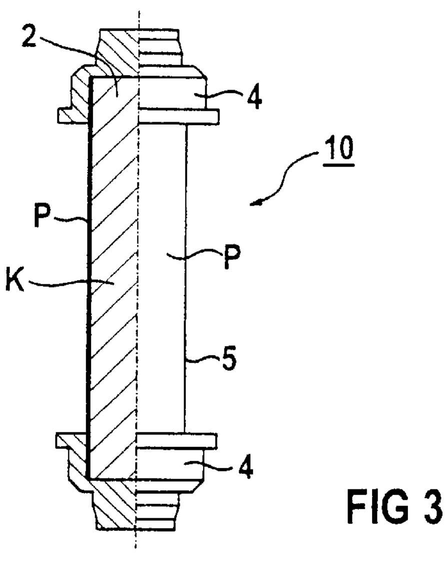
FIG. 3 shows a partially broken-open representation of an insulator according to FIG. 1, with the ceramic molding being reduced to the cylindrical shank.

In FIG. 3, an insulator 10 adapted for use as a high-voltage insulator is shown, the molding 2 made of ceramic K being reduced to the shank 5, by contrast with the insulators 1 and 7 according to FIG. 1 and FIG. 2. Shields for increasing the leakage distance of a discharge current are not provided between the two connection caps 4. Since there are no horizontal surfaces, the insulator 10 is additionally protected against dust deposits. In comparison with the insulators 1 and 7, the insulator 10 can be produced at much lower cost, since the ceramic material K of the shields 6 is saved. The production costs for the insulator 10 are, moreover, much lower than for the insulators 1 and 7, since there is no need for the complex shaping for the shields 6. The expensive turning of the shields 6 from the still unfired, soft molding 2 is not needed.

Figure 4:
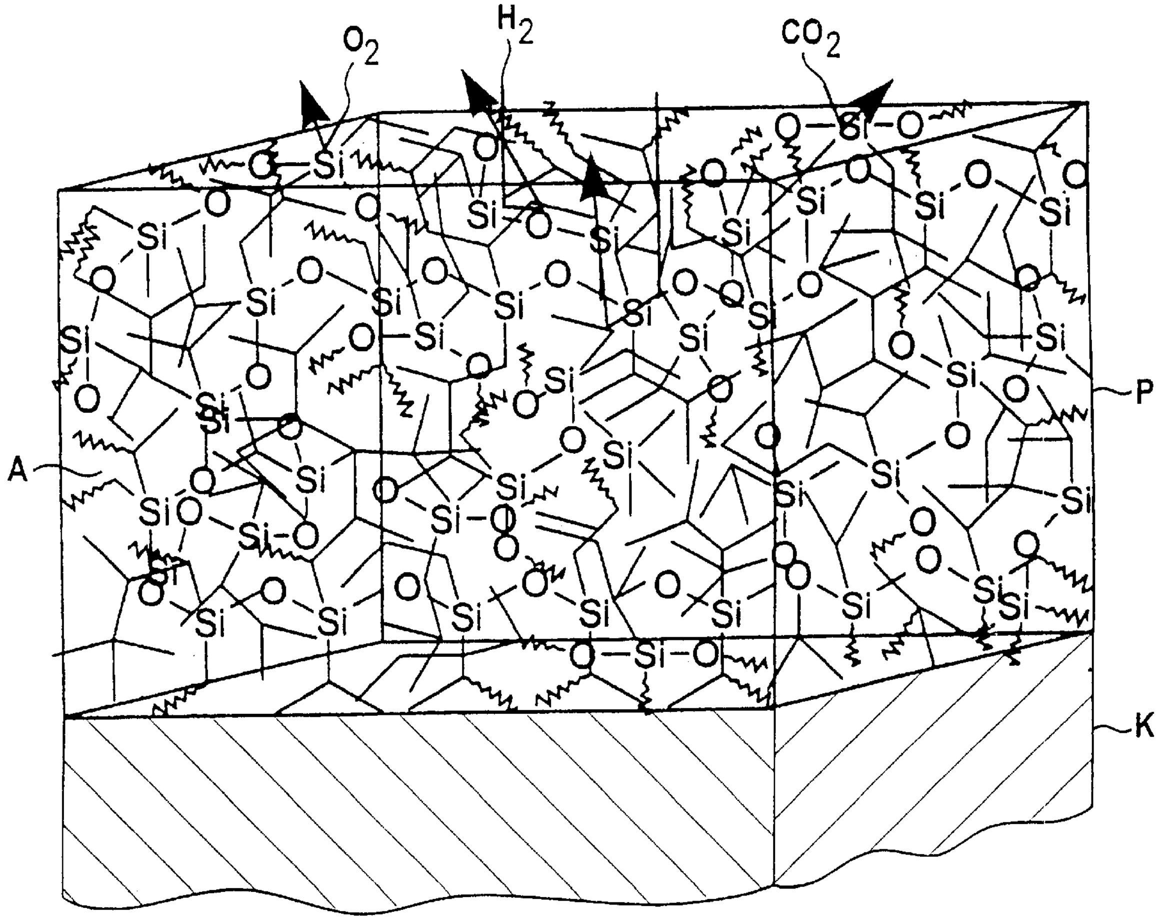
FIG. 4 shows in an enlarged detail of the insulator according to FIG. 1 the plasma polymer applied to the ceramic of the molding.

FIG. 4 shows an enlarged representation of detail IV from FIG. 1. The plasma polymer P applied directly to the surface of the ceramic K of the molding can be clearly seen. The plasma polymer P shown is a plasma-polymerized hexamethyldisiloxane. The high degree of crosslinking of the individual molecular groups among one another can be seen. The crosslinkage is achieved in this plasma polymer P mainly by means of oxygen bridges. The bonding of the plasma polymer P to the ceramic K takes place by means of hydroxyl bonds. As a result of the non-polar $CH_3$ groups of the hexamethyldisiloxane, the surface of the plasma-polymerized hexamethyldisiloxane has a low level of energy and is consequently highly hydrophobic. The oxygen bonds of individual silicon atoms have the effect that the plasma polymer PL has a high level of hardness. The high crosslinkage has the effect that the plasma polymer P also has a highly dense structure, so that diffusion through it of molecules such as oxygen, hydrogen or carbon dioxide is prevented. The ceramic K is protected from environmental influences by the plasma polymer P. Oriented structures like in a conventional polymer cannot be seen. Rather, an amorphous structure is shown.

We claim:

1. An insulator comprising a shaped body of porcelain having a rough surface and a hydrophobic coating directly applied to said rough surface, said hydrophobic coating including a plasma polymer.

2. The insulator of claim 1, wherein said plasma polymer is derived from a volatile compound having non-polar groups.

3. The insulator of claim 2, wherein said volatile compound is selected from the group consisting of organosilicon compounds, organofluorine compounds, and mixtures thereof.

4. The insulator of claim 3, wherein said organosilicon compound is a hexamethyldisiloxane, a tetraethyl orthosilicate, or a vinyltrimethylsilane.

5. The insulator of claim 3, wherein said organofluorine compound is octafluorocyclobutane.

6. The insulator of claim 1, wherein the wetting angle against deionized water is in the range from 90° to 140°.

7. The insulator of claim 1, wherein said plasma polymer has an amorphous structure.

8. The insulator of claim 1, wherein the thickness of said coating is in the range from 50 nm to 10 $\mu$m.

9. The insulator of claim 1, wherein said porcelain comprises an admixture of aluminum oxide.

10. The insulator of claim 1, shaped as a high voltage insulator.

11. The insulator of claim 10 having a substantially cylindrical shape.

12. An insulator consisting essentially of a molded porcelain having a rough surface and a hydrophobic coating directly applied to said rough surface, said hydrophobic coating including a plasma polymer.

13. The insulator of claim 12, wherein said coating comprises a plasma polymer of a hexamethyldisiloxane, a tetraethyl orthosilicate, or a vinyltrimethylsilane.

14. An insulator comprising a shaped body of ceramic shaped as a high voltage insulator having directly applied to a surface thereof a hydrophobic coating comprising a plasma polymer.

15. The insulator of claim 14 having a substantially cylindrical shape.

* * * * *